Dec. 22, 1964    H. A. POHL    3,162,592
MATERIALS SEPARATION USING NON-UNIFORM ELECTRIC FIELDS
Filed April 20, 1960
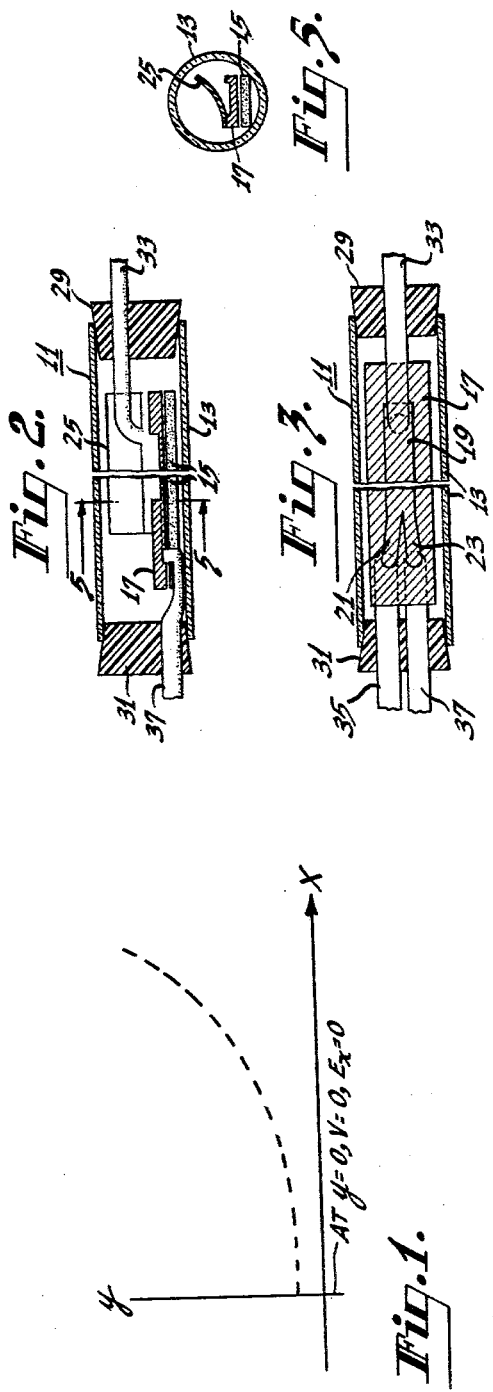
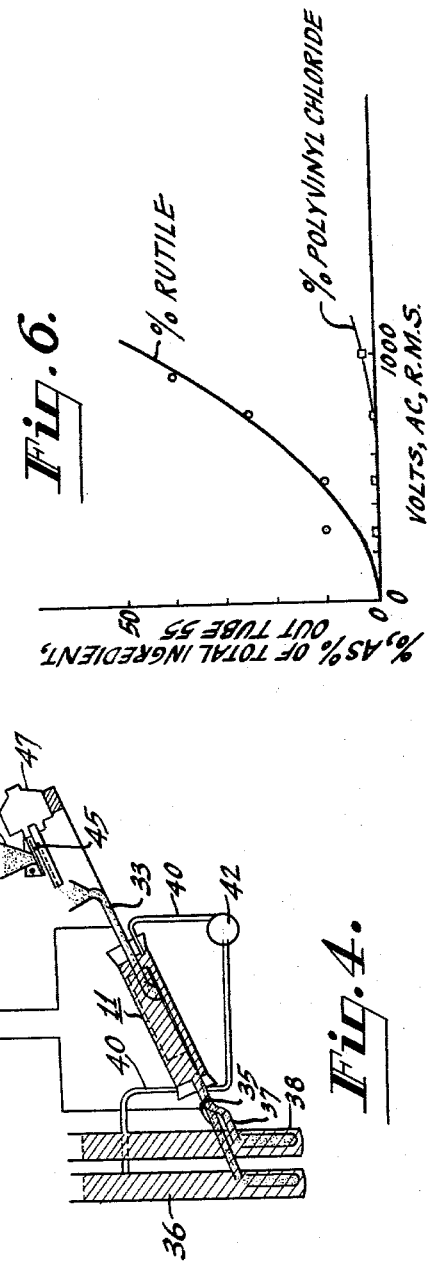
INVENTOR.
HERBERT ACKLAND POHL
BY
ATTORNEY 3,162,592
MATERIALS SEPARATION USING NON-UNIFORM
ELECTRIC FIELDS
Herbert Ackland Pohl, Princeton, N.J.
(338 Franklin Ave., Princeton Township, N.J.)
Filed Apr. 20, 1960, Ser. No. 23,431
10 Claims. (Cl. 204—186)

This invention relates to the separation of mixtures of physical substances, and particularly is directed to a new and improved particle separating method and system employing non-uniform electric fields applied to mixtures of materials having different dielectric constants.

Various types of forces have been used heretofore for separating mixtures of physical substances. Such forces include the mechanical force of gravity, forces which depend on the action of strong chemical reagents, nuclear forces exemplified by lead shields which absorb radiation, and magnetic forces used for such purposes as removing iron and steel from among other materials. Another type of force is available and has been little used except upon electrically charged particles as in electrolysis or in the collection and capture of dust.

It is known that electric fields may be used to exert a force on electrically neutral particles as well as charged particles provided the electric field is non-uniform, i.e., there is a uniform gradient of field. This effect has been employed previously with the electric field applied to a polymer solution for purposes of measuring the relative concentrations of the components of the polymer by a change in the capacitance existing between electrodes immersed in the solution.

It has been discovered however that an applied non-uniform electric field also may be utilized for an entirely different purpose, i.e., the separation and extraction of one or more materials from a heterogeneous physical mixture of materials. The apparatus for producing this result in effect comprises an electrical siphon which is particularly useful in mineralogical, pharmaceutical, metallurgical, and other fields.

Previous attempts to utilize non-uniform electric fields for such purposes in general have been unsatisfactory either because (i) the materials separation efficiency has been relatively low or (ii) the systems were designed such that undesired electrical discharges occurred or forces exerted on the particles of the materials to be separated varied as a function of the position of the particles in the electric field.

Accordingly, an object of the present invention is to provide improved methods and means for separating and extracting components of a heterogeneous mixture of materials.

Another object of the invention is to utilize a non-uniform electric field for more efficiently separating and extracting the components of such mixtures of materials.

A further object of the invention is to utilize the phenomenon of dielectrophoresis for improved separation of mixtures of materials.

A still further object of the invention is to separate and extract the components of such mixtures by an improved technique utilizing the differing dielectric constants of the materials comprising the mixture.

The foregoing and other objects and advantages of the invention are achieved by what will be referred to herein as an "Isomotive" cell. In accordance with the invention and in the Isomotive cell, a mixture of materials of differing dielectric constants or polarizabilities, for example, in powdered form, is applied at a desired rate to a materials receiving means such as a trough or tray immersed in a suitable dielectric fluid. The bottom of the trough or tray is inclined at an angle with respect to the horizontal and its sides have a slight angle of tilt to allow the mixture to slide, under the influence of gravity, along one edge of the trough or tray. Properly shaped electrodes are positioned with respect to the materials receiving means to produce an applied non-uniform electric field. The field strength is adjusted so that, by dielectrophoresis, one powder moves to the high side of the materials receiving means and the other powder falls along the low side of the materials receiving means. The powders thus separated are extracted from the Isomotive cell through suitable exit ports.

Dielectrophoresis is a phenomenon in which the most polar material moves most strongly toward the region of greatest field intensity. Unlike electrophoresis, this phenomenon does not require use of charged particles since there is force exerted upon all neutral matter in a non-uniform field. The separation of the powders therefore arises from unequal pulls being exerted upon the dipoles produced by the particles of differing dielectric constants or polarizabilities in the non-uniform field. Reversal of the direction of applied electric field produces no change in the direction of the pull on isotropically polarizable particles.

The invention will be described in detail with reference to the accompanying drawings in which:

FIGURE 1 is a drawing helpful in understanding theoretical considerations involved in the design of electrodes in an Isomotive cell;

FIGURE 2 is a detailed side view of an Isomotive cell fabricated in accordance with the invention, which cell is shown in inclined position in FIGURE 4;

FIGURE 3 is detailed top view of the Isomotive cell shown in FIGURE 2;

FIGURE 4 is a schematic drawing of materials separation apparatus according to the invention which utilizes an Isomotive cell of the type shown in FIGURES 2 and 3;

FIGURE 5 is an end view of the Isomotive cell taken along the section line 5—5 of FIGURE 2; and, FIGURE 6 is a curve which illustrates the behavior of a polyvinyl chloride-rutile mixture in an Isomotive cell over a range of applied voltages.

Like reference characters are applied to like elements throughout the drawing.

*Theoretical Considerations in the Design of Isomotive Cell Electrodes*

In the Isomotive cell the electrodes in the system are designed such that the forces exerted upon the electrically neutral particles in the non-uniform electric field do not depend upon the geometric position of the particles in the cell as the particles fall freely through the cell and the dielectric fluid.

It is believed that principal forces exerted on the particles in the cell are as follows:

(a) Osmotic.
(b) Gravitational (corrected for buoyancy).
(c) Dielectrophoretic, arising from the effect of the non-uniform electric field on the field-polarized neutral particles.
(d) Dielectrophoretic, arising from the effect of the non-uniform electric field on the current-induced (or produced) dipoles on the particle surface.
(e) Electrophoretic, arising from the effect of the electric field on *excess* charges on the particles.

A simplified theory of the net force on a particle at any time after arrival of the particle in the non-uniform field is given below for spherical particles, excluding the more difficultly calculable electrophoretic forces arising from more or less random charging and osmotic or concentration gradient forces which are generally negligible for particles in excess of about 0.2 micron diameter.

The gravitational force, $F_g$, effective along the bottom of the tilted trough or tray is (1) $$Fg = -\underline{i}\,\frac{4}{3}(d_2-d_1)a^3 g \sin\alpha$$

where $a$ is the particle radius, $d_1$ and $d_2$ are the densities of the liquid dielectric and particle, respectively, $g$ is a gravitational constant and $\alpha$ is the angle of tilt from the horizontal of the trough or tray.

The dielectrophoretic force, $F_e$, on neutral particles arising from induction in a non-uniform field (see J. Appl. Phys. 29, 1182 (1958)) is (2) $$\underline{F_e} = 2a^3 K_1^1 \epsilon_0 \left(\frac{K_2^1 - K_1^1}{K_2^1 - 2K_1^1}\right) \nabla \underline{E}^2$$

where $K_1^1$ and $K_2^1$ are the relative dielectric constants of the liquid dielectric and particle, respectively, $\epsilon_0$ is the permitivity of free space, and $\underline{E}$ is the electric field at the particle.

Expression 2 may be simplified for present purposes to (3) $$F = \frac{\alpha}{2} \nabla |E|^2$$

where $F$ is the dielectrophoretic force *per unit volume* of the particle, $\alpha/2$ is a constant characteristic of the electrical properties of the particle and its surrounding medium, and $\nabla |E|^2$ is a vector gradient of the absolute value of the electric field strength.

What is particularly desired is to establish an electric field of such a character that the dielectrophoretic force, F (or $F_e$, e.g.), is equivalently opposite to the gravitational forces across the width of the cell. This equivalency of force is extremely desirable in order to effect maximum efficiency of operation. Should the forces anywhere across the cell width be unequal, i.e., not equivalently opposite, the selectivity of the electric field among particles of differing polarizabilities would be much diminished.

The general objective, therefore, is to provide that $F_e = F_g$ at any point across the width of the cell. One method of achieving this objective, which is shown herein and which will be described later, is to satisfy the condition $F_g = F_e =$ constant. This method involves the proper design of electrode shapes in accordance with the mathematical expressions about to be shown.

From Expression 3 the dielectrophoretic force, F, per unit volume of the particle is $$\frac{\alpha}{2} \nabla |E|^2 \text{ and (see Figure 1)}$$

(4) $$F = \underline{i}\,F_x + \underline{j}\,F_y = -c = \text{constant at } y = 0$$

By symmetry, at $y=0$, $F_y = 0$. Therefore by setting $$F_x\Big|_{y=0} = \text{constant} = -c_1^1 \text{ and } F_y\Big|_{y=0} = 0$$

(5) $$\frac{\alpha}{2}\frac{\partial |E|^2}{\partial x} = -c_1^1 \text{ at } y = 0$$

and (6) $$\frac{\partial |E|^2}{\partial x} = -c_1 \text{ at } y = 0$$

As $$|E|^2 = \left(\frac{\partial V}{\partial y}\right)^2 + \left(\frac{\partial V}{\partial y}\right)^2 = E_x^2 + E_y^2$$

$V$ being the applied potential, and as $$E_x\Big|_{y=0} = 0, \quad V\Big|_{y=0} = 0$$

and (7) $$\frac{\partial E_y^2}{\partial x}\Big|_{y=0} = -c_1$$

Performing the partial integration (8) $$E_y^2\Big|_{y=0} = -c_1 x + c_2$$

where $c_2 =$ the constant of integration and (9) $$E_y\Big|_{y=0} = \pm\sqrt{c_2 - c_1 x}$$

This is a boundary condition on the field. The field must be charge free (i.e., dielectrophoresis, not electrophoresis). Therefore, the Laplacian condition

(10) $$\frac{\partial^2 v}{\partial x^2} + \frac{\partial^2 v}{\partial y^2} = 0$$

applies. Combining Expressions 9 and 10 the relations between $x$ and $y$ are given (and, as a result, the electrode shapes) for a divergent electric field such that the dielectrophoretic force remains independent of the $x$ coordinate for the region $0 < x < x_0$.

The Isomotive Cell

Referring to the drawing, FIGURES 2 through 4 show an Isomotive cell in accordance with the invention. The cell 11 comprises a hollow glass cylinder 13 containing a flat rectangular metal plate 15 such as brass, which supports a grooved Teflon plate or trough 17. The trough 17 has a single wide groove 19 at one end which extends along a major portion of its length and then divides into two separate narrower channels or grooves 21 and 23. Supported above the plate 15 and the trough 17 is a curved or arcuately shaped electrode 25 (see FIGURE 5) which also may be brass.

The curved electrode 25 is shaped so that when a potential is applied between the electrodes 15 and 25 a non-uniform electric field is produced transverse to the length of the trough 17. Either a pulsating direct-current potential or an alternating-current potential may be used to produce the non-uniform electric field. The latter is preferred however since increased efficiency of operation results due to increased agitation of the mixture to be processed through the trough 17 in the manner to be described below. The field produces a dielectrophoretic force which is essentially constant and in opposition to the force of gravity. At each end of the cylinder 11 apertured end plugs, 29 and 31, for example, neoprene or some other suitably solvent resistant material, are provided for sealing off the cell except for desired inlet and outlet connections. The inlet connection to the cell 11 comprises a copper tube 33 having an enlarged or funnel-like opening at one end. The other end of the tube 33 passes through an aperture in the end plug 29 and terminates just over the uppermost end of the groove 19. The end of the tube 33 adjacent the groove 19 is bonded to the curved electrode 25 to provide good electrical connection thereto. The outlet connections to the cell 11 comprise a pair of copper tubes 35 and 37 which pass through a pair of apertures in the other end plug 31. One end of each of the tubes 35 and 37 is electrically bonded to the plate 15 adjacent the lowermost end of the grooves 21 and 23. The other ends of the tubes 35 and 37 feed into separate collector vessels 36 and 38 for receiving the separated materials. A low viscosity liquid dielectric such as benzene or cyclohexane, is contained in the vessels 36 and 38 and the liquid is continuously circulated through the cell 11 by means of a conduit 40 and a pump 42. An electric field is established between the flat and curved plates 15 and 25, respectively, by means of connections 39 and 41 connected between a pulsating direct current or alternating current potential source (not shown) and the tube 33 and one or both the tubes 35 and 37.

In operation the materials to be separated, for example a powdered mixture of polyvinyl chloride and rutile, are contained in a supply hopper 43. The mixture passes through an opening in the bottom of the hopper 43 onto an inclined plate 45 which is actuated by a vibrator 47. The motion imparted to the plate 45 disperses clumps of the mixture. The dispersed mixture is then fed into the funnel-like opening at the end of the inlet tube 33, travels through the tube 33, and is deposited in the trough 17 near the upper end of the groove 19. The trough 17 is inclined at an angle with respect to the horizontal, say 30°, and the sides of the trough are given a slight angle of tilt with respect to the vertical, say 3°, so that in the absence of an applied electric field the mixture will slide along one edge of the trough under the influence of gravity, pass through the outlet tube, and be collected in the vessel 38.

However, because of the dielectrophoretic force exerted on the mixture by the non-uniform electric field as the mixture traverses the length of the cell 11 a substantial number of the rutile particles are deflected toward and into the groove 21 while a substantial number of the polyvinyl chloride particles are little affected by the dielectrophoretic force and fall toward and into the groove 23. The particles thus separated pass through apertures in the trough 17 and into the outlet tubes 35 and 37 through which they are conveyed to the collector vessels 36 and 38.

For a mixture of 60–100 mesh rutile and 60–80 mesh polyvinyl chloride it was observed (see FIGURE 6) that at very low voltages substantially no material in the mixture passed through the tube 35 and into the collector vessel 36. As the voltage was increased a greater and greater amount of rutile passed through the tube 35 until a voltage of about 750 volts was reached. Further increase in applied potential resulted in less selectivity in materials separation.

It will be appreciated that reference to the foregoing mixtures of materials is by way of illustration only and that the particular apparatus described, which also is illustrative only, may be used for the separation of numerous mixtures of materials, for example, reconcentration of industrial diamonds (from the diamond wheel cuttings of ceramic materials), removal of zircon from rutile-zircon sands, pulling sodium dichromate from a mixture with titanium dioxide, etc.

What is claimed is:

1. The method of treating a mixture of electrically neutral solid materials having different dielectric polarizations comprising, applying a non-uniform electric field to said mixture to deflect one of the solid materials in said mixture to a greater extent than other solid materials in said mixture, and withdrawing from said deflection field at least one of said solid materials.

2. The method of treating a mixture of electrically neutral solid materials having different dielectric constants comprising, applying a non-uniform electric field to said mixture to dielectrophoretically separate said solid materials, and extracting at least one of said solid materials from the influence of said field.

3. The method of treating a mixture of electrically neutral solid materials having different dielectric polarizations comprising, causing said mixture to fall relatively freely along a predetermined path, applying a non-uniform electric field to said mixture over a major portion of said path to deflect one of the solid materials in said mixture to a greater extent than other materials in said mixture, and withdrawing from said deflection field at least one of said solid materials.

4. The method of treating a mixture of electrically neutral solid materials having differnt dielectric constants comprising, causing said mixture to fall relatively freely along a predetermined path, applying a non-uniform electric field to said mixture over a major portion of said path to produce a dielectrophoretic force for deflecting one of the solid materials in said mixture to a greater extent than other solid materials in said mixture, and withdrawing at least one of said solid materials from the influence of said field.

5. A method as claimed in claim 4 wherein said dielectrophoretic force is equal and opposite to the force of gravity.

6. Apparatus for treating a mixture of electrically neutral solid materials having different dielectric constants comprising, a materials receiving means for receiving said mixture of materials including means through which said mixture may travel over a path which is long compared to its width, said materials receiving means being immersed in a low viscosity dielectric medium, means for applying a non-uniform electric field to said materials receiving means over a major portion of the length of said path for dielectrophoretically separating said solid materials, and means coupled to said materials receiving means for withdrawing at least one of said separated solid materials from the influence of said field.

7. Apparatus for treating a mixture of electrically neutral solid materials having different dielectric constants comprising, a materials receiving means for receiving said mixture of materials including means through which said mixture may travel over a path which is long compared to its width, said materials receiving means being immersed in a low viscosity liquid dielectric, means for applying a non-uniform electric field to said materials receiving means over a major portion of the length of said path for dielectrophoretically separating said solid materials, and means coupled to said materials receiving means for withdrawing at least one of said separated solid materials from the influence of said field.

8. Apparatus for treating a mixture of solid materials having different dielectric constants comprising a materials receiving means including a Y-shaped channel, said materials receiving means being inclined with respect to both the vertical and the horizontal, a low viscosity dielectric fluid surrounding said materials receiving means, means for supplying said mixture at a substantially constant rate to said materials receiving means at its upper or single-channel end, and means for producing a non-uniform electric field and applying said field to said mixture to dielectrophoretically separate said mixture of solid materials so that one of the materials of said mixture is deflected into and travels through one of the two channels at the lower end of said Y-shaped channel and the remainder of said mixture enters and travels through the other of two channels at the lower end of said Y-shaped channel.

9. Apparatus as claimed in claim 8 wherein said electric field is divergent and the dielectrophoretic force applied to said mixture is relatively constant and equivalently opposite to gravitational forces acting on said mixture.

10. Apparatus as claimed in claim 8 wherein said field producing means includes a pair of electrodes located on opposite sides of said materials receiving means, one of said electrodes being flat and the other of said electrodes being curved.

References Cited in the file of this patent

UNITED STATES PATENTS

| 1,154,907 | Bibolini | Sept. 28, 1915 |
| 2,666,739 | Packie | Jan. 19, 1954 |
| 2,914,453 | Wennerberg | Nov. 24, 1959 |

FOREIGN PATENTS

| 478,764 | Great Britain | Jan. 25, 1938 |

OTHER REFERENCES

Pohl: J. Applied Phys., 22, 869–71 (1951).